United States Patent [19]
Tenjinbayashi

[11] Patent Number: 5,438,412
[45] Date of Patent: Aug. 1, 1995

[54] PHASE CONJUGATE INTERFEROMETER FOR TESTING PARABOLOIDAL MIRROR SURFACES

[75] Inventor: Koji Tenjinbayashi, Tsukuba, Japan

[73] Assignee: Agency of Industrial Science Technology, Ministry of International Trade & Industry, Tokyo, Japan

[21] Appl. No.: 210,292

[22] Filed: Mar. 18, 1994

[30] Foreign Application Priority Data

Mar. 31, 1993 [JP] Japan .................................. 5-097308

[51] Int. Cl.$^6$ ................................................ G01B 9/02
[52] U.S. Cl. ..................................... 356/359; 356/345
[58] Field of Search ............... 356/345, 359, 360, 353; 250/227.19, 227.27

[56] References Cited
PUBLICATIONS

"Interferometer with a Self-Pumped Phase-Conjugating Mirror", Feinberg, Optical Letters, Nov. 1983, pp. 569-571.

*Primary Examiner*—Samuel A. Turner
*Attorney, Agent, or Firm*—Oblon, Spivak, McClelland, Maier & Neustadt

[57] ABSTRACT

A phase conjugate interferometer includes a laser light source, an optical lens (through which the laser beam is diverged) disposed at the end of the optical fiber, a paraboloidal mirror surface to be tested which reflects the laser beam diverged by the objective lens, a semi-transparent mirror disposed between the objective lens and the paraboloidal mirror surface for transmitting the laser beam from the objective lens to the paraboloidal mirror surface, a light reflection portion having both a parallel plane glass plate with a reference flat surface and a non-linear optical crystal for causing a phase conjugate wave front, and a screen. The light reflection portion reflects the incident laser beam reflected by the paraboloidal mirror surface as two laser beams, one with a reference flat surface and the other with a phase conjugate wave front caused by the non-linear optical crystal. The semi-transparent mirror reflects the two laser beams reflected by the light reflection portion and then by the paraboloidal mirror surface. The screen displays an interference fringe pattern formed by the two laser beams reflected by the semi-transparent mirror.

1 Claim, 2 Drawing Sheets

PHASE CONJUGATE INTERFEROMETER FOR TESTING PARABOLOIDAL MIRROR SURFACES

BACKGROUND OF THE INVENTION

1. Field of the Invention

The present invention relates to a phase conjugate interferometer for high precision shape testing of paraboloidal mirror surfaces, and more particularly to a phase conjugate interferometer for high precision testing of the shape of paraboloidal mirror surfaces, using a Fizeau type interferometer with an optical fiber laser beam guide.

2. Description of the Prior Art

The ability of paraboloidal mirror surfaces to precisely converge a parallel beam of light to a single point make them extremely useful as converging reflectors for laser processing, where they permit precision processing, and as primary mirrors in telescopes, where they make it possible to realize detailed observations.

Previously the technical difficulty of fabricating paraboloidal mirror surfaces has made them costly and limited their use. In recent years, however, advances in very high precision processing technology and the use of diamond-tool machining and the like have made it possible to fabricate paraboloidal reflectors relatively simply and at low cost, and this is causing them to be used more widely.

When a paraboloidal mirror surface is fabricated, the mirror surface finish has to be tested. This testing is usually done with an interferometer, which does not involve contact with the surface being measured, provides high precision and enables the entire surface to be tested simultaneously. However, a major problem with a Fizeau type high precision interferometer that it uses a double reflection system and it is impossible to identify the position of surface shape errors.

This is explained with reference to FIG. 2, which shows a Fizeau type high precision interferometer. A laser beam from a laser light source 1 is diverged by an objective lens 3 after focussing at pinhole 2, transmitted by a half mirror 4 and collimated by a collimating lens 5 and impinges on a paraboloidal reflector 6 being tested. An auxiliary flat reflector 7 reflects the light reflected by the paraboloidal reflector 6 back onto the paraboloidal reflector 6, and the light is then projected onto a screen 9 by the half mirror 4. Assuming the paraboloidal reflector 6 has a shape error portion 6', when the light reflected by the paraboloidal reflector 6 is reflected back to the paraboloidal reflector 6 by the auxiliary flat reflector 7, light reflecting from the shape error portion 6' will impinge on point 8. It has been found that when the shape error portion 6' has a large inclination it becomes impossible to identify that the error is at portion 6'.

To overcome this drawback, the single reflection system Mach-Zehnder high precision interferometer was designed as an improvement over the double reflection Fizeau type interferometer. As shown by the Mach-Zehnder interferometer arrangement shown in FIG. 3, a laser beam from a laser light source 10 is diverged by a lens 11, passed through collimating lens 12 and impinges on a semi-transparent mirror 13. Light reflected by the semi-transparent mirror 13 passes via mirrors 14, 15 and 16, semi-transparent mirror 17 and lens 18, whereby it is projected onto a screen 19. The light that is transmitted by the semi-transparent mirror 13 passes through collimating lens 20 and impinges on paraboloidal reflector 21, from which the light is reflected through collimating lens 22 and onto the semi-transparent mirror 17. The light that is reflected by the semi-transparent mirror 17 is projected onto the screen 19 via the lens 18.

However, the above interferometer requires numerous high precision lenses, which are difficult to adjust and make the system costly. Moreover, because the light travels by different paths, the system is prone to the effects of air turbulence and external vibration, which can degrade the precision of test results, in addition to which the apparatus is large and bulky.

The object of the present invention is to provide an improved, high precision phase conjugate interferometer that is compact is low in cost and has an optical system that can be readily adjusted.

SUMMARY OF THE INVENTION

The above object is attained by a phase conjugate interferometer according to the present invention, comprising a laser light source, an optical fiber for guiding a laser beam emitted by the laser light source, an objective lens by which the laser beam is diverged via a pinhole, said objective lens being disposed at the end of the optical fiber, a paraboloidal mirror surface to be tested which reflects the laser beam passed through the pinhole, a light reflection portion having a parallel plane glass plate with a reference flat surface and a non-linear optical crystal, said light reflection portion reflecting the incident laser beam reflected by the paraboloidal mirror surface as a laser beam with a reference flat surface reflected wave front imparted by the reference flat surface of the parallel plane glass plate, and a laser light beam with a phase conjugate reflected wave front imparted by the non-linear optical crystal, and a screen for displaying an interference fringe pattern formed by the two laser beams reflected by the light reflection portion.

With the phase conjugate interferometer of this invention, the wave fronts produce a mutual inversion of the shape which includes the error, so the interference pattern shows the error magnified to twice its size, thereby making it possible to carry out high precision measurement.

Moreover, as the apparatus does not require the use of high precision lenses; is structurally simple and straightforward, it can be fabricated compactly and at low cost. High precision measurement is also assured by the fact that the incident and reflected beams pass along the same path, an arrangement which is not readily prone to the effects of external disturbances. Also, the use of an optical fiber to guide the laser beam considerably eases the task of adjusting the optical system, which consists merely of aligning the end of the optical fiber fixed at the focus of the paraboloidal mirror surface.

Further features of the invention, its nature and various advantages will be more apparent from the accompanying drawings and following detailed description of the invention.

DESCRIPTION OF THE PREFERRED EMBODIMENT

Figure 1:
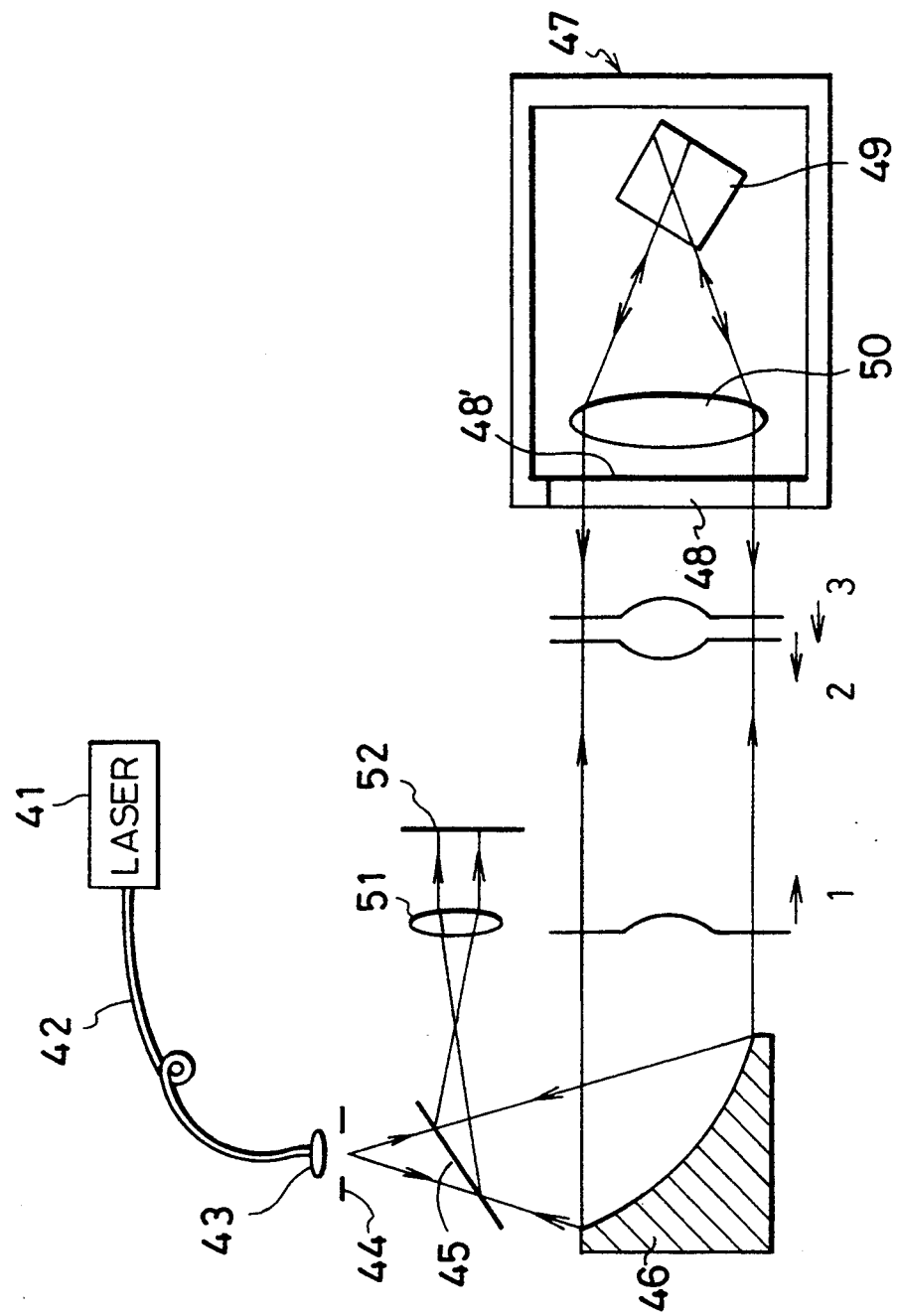
FIG. 1 illustrates the arrangement of an embodiment of the phase conjugate interferometer for testing paraboloidal mirror surfaces according to the present invention.
Figure 2:
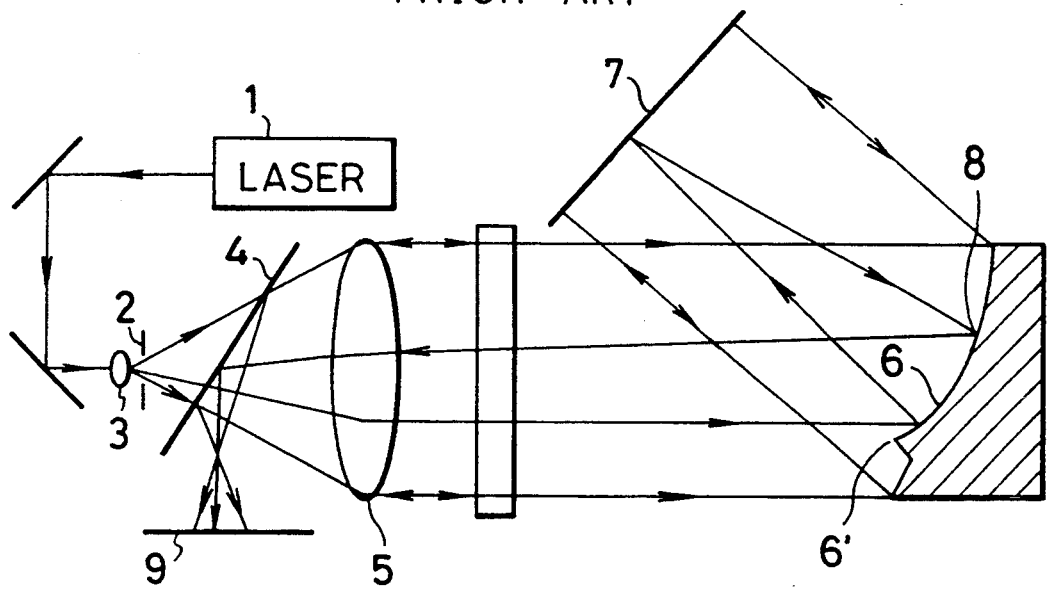
FIG. 2 illustrates the arrangement of a conventional double reflection system Fizeau type high precision interferometer.
Figure 3:
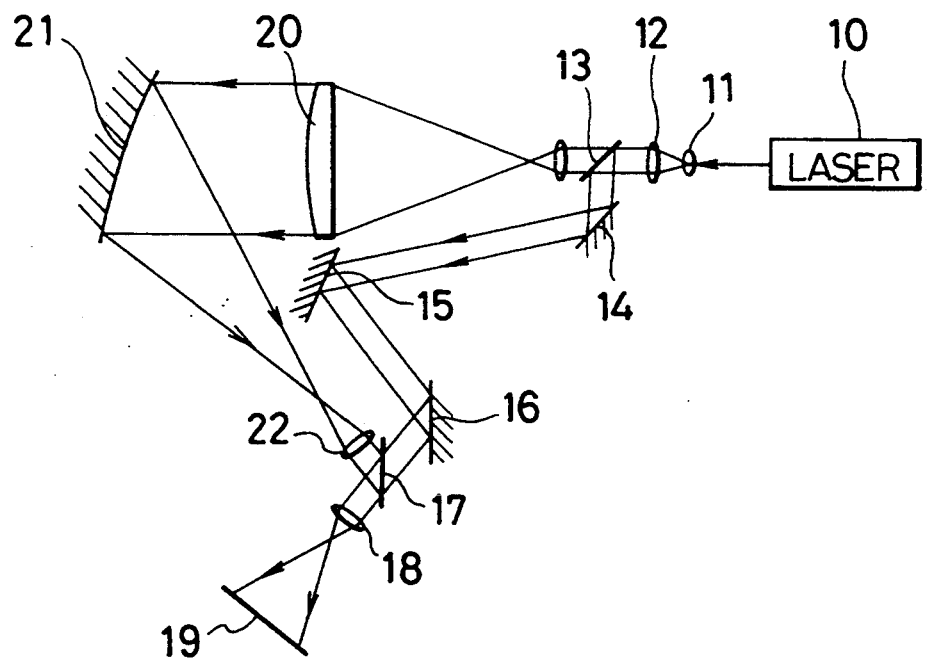
FIG. 3 shows the arrangement of a conventional single reflection system Mach-Zehnder high precision interferometer.

FIG. 1 shows the arrangement of an embodiment of the phase conjugate interferometer for testing paraboloidal mirror surfaces according to the present invention. In FIG. 1, a laser light source 41 that produces a laser beam is provided with an optical fiber 42 that guides the laser beam emitted by the laser light source 41. The end of the optical fiber 42 is provided with an objective lens 43, such as an objective lens of an ordinary microscope may be used for this purpose. Arranged in opposition to the objective lens 43 is a pinhole 44. A semi-transparent mirror 45 is arranged in the direction of propagation of the laser beam passing through the pinhole 44. The semi-transparent mirror 45 both transmits the laser beam and reflects the returning reflected light, as described below. A paraboloidal mirror surface 46 to be tested is disposed in the direction of propagation of light transmitted by the semi-transparent mirror 45. The outgoing beam side of the paraboloidal mirror surface 46 is provided with a parallel plane glass plate 48 that has a reference flat surface 48', and a light reflection portion 47 that has a non-linear optical crystal 49 and a lens 50. The parallel plane glass plate 48 is a glass plate in which the front and back planes are parallel to each other, the front surface has been given a non-reflecting coating, and the rear surface is a reference flat surface with a certain reflectivity. For example, $BaTiO_3$ is used as the non-linear optical crystal 49. Provided on the reflected laser beam side of the semi-transparent mirror 45 are a lens 51 and a screen 52 on which the interference pattern is projected.

In the phase conjugate interferometer thus configured, the optical fiber 42, objective lens 43 and pinhole 44 are arranged as a single integrated unit, which facilitates adjusting the alignment of the projected laser beam.

The laser beam transmitted by the semi-transparent mirror 45 impinges on the paraboloidal mirror surface 46 and is reflected back towards the light reflection portion 47. While in the illustrated embodiment the paraboloidal mirror surface 46 deflects the laser beam substantially at right angles, the deflection angle is arbitrary.

If there is an error in the paraboloidal mirror surface 46 in the form of a small projection in the central portion, this will produce the reflected wave front denoted by ①. Part of the laser beam incident on the light reflection portion 47 is reflected by the reference flat surface 48' of the parallel plane glass plate 48 as reference flat surface reflected wave front ②, a wave front symmetrical to that of the incident reflected wave front ①. A portion of the light transmitted by the parallel plane glass plate 48 is converged by the lens 50 onto the non-linear optical crystal 49, which emits a phase conjugate reflected wave front ③ that is the same as the incident reflected wave front ①. Thus, a laser beam having a reference flat surface reflected wave front ② and a laser beam having a phase conjugate reflected wave front ③ are reflected back to the paraboloidal mirror surface 46 by the light reflection portion 47, and the beams are thus reflected and pass via the semi-transparent mirror 45 and lens 51 to impinge on the screen 52, producing an interference pattern formed by the two wave fronts ② and ③.

As the wave fronts ② and ③ produce a mutual inversion of the shape which includes the error, the interference pattern shows the error magnified to twice its size, providing high precision measurement capability. A known method such as fringe scanning may be used to calculate the error in a paraboloidal mirror surface from the interference fringe pattern projected on the screen 52.

In accordance with the invention as described in the foregoing, it is possible to realize a reliable, high performance, low cost phase conjugate interferometer for testing paraboloidal mirror surfaces. It is low cost because an objective lens and pinhole arrangement is used to produce a high precision spherical wave laser beam, eliminating the need for high precision lenses. As the incident and reflected beams pass along the same path the apparatus is not readily prone to the effects of external disturbances, so there is no degradation of results and, in addition, the system apparatus can be made more compact. Also, the use of optical fiber to guide the laser beam eases the task of adjusting the system by eliminating the need to move and adjust the paraboloidal mirror surface.

Obviously, numerous modifications and variations of the present invention are possible in light of the above teachings. It is therefore to be understood that within the scope of the appended claims, the invention may be practiced otherwise than as specifically described herein.

Japanese Patent Application No. 5-97308 filed Mar. 31, 1993 is hereby incorporated by reference.

What is claimed is:

1. A phase conjugate interferometer for testing paraboloidal mirror surfaces, comprising:

a laser light source;

an optical fiber for guiding a laser beam emitted by the laser light source;

an objective lens through which the laser beam is diverged, said objective lens being disposed at the end of the optical fiber;

a semi-transparent mirror disposed between the objective lens and the paraboloidal mirror surface for transmitting the laser beam from the objective lens to the paraboloidal mirror surface;

a light reflection portion having both a parallel plane glass plate with a reference flat surface and a non-linear optical crystal for causing a phase conjugate wave front, said light reflection portion reflecting the incident laser beam reflected by the paraboloidal mirror surface not only as a laser beam with a reflection flat surface reflected wave front imparted by the reference flat surface of the parallel plane glass plate, but also as a laser beam with a phase conjugate wave front caused by the non-linear optical crystal;

said semi-transparent mirror reflecting the two laser beams reflected by the light reflection portion and then by the paraboloidal mirror surface; and a screen for displaying an interference fringe pattern formed by the two laser beams reflected by the semi-transparent mirror.

* * * * *